United States Patent [19]

Buslik

[11] 3,788,576

[45] Jan. 29, 1974

[54] MAGNETIC TAPE CARTRIDGE AND STORAGE APPARATUS

[75] Inventor: Walter Siegbert Buslik, San Jose, Calif.

[73] Assignee: International Business Machines Corporation, Armonk, N.Y.

[22] Filed: Dec. 11, 1972

[21] Appl. No.: 313,716

[52] U.S. Cl. .......... 242/199, 179/100.2 Z, 274/4 B, 274/11 B

[51] Int. Cl.... G03b 1/04, G11b 15/32, G11b 23/04

[58] Field of Search ............................ 242/197–200; 352/72–78; 179/100.2 Z; 274/4 B, 4 C, 11 B, 11 C

[56] References Cited

UNITED STATES PATENTS

| | | | |
|---|---|---|---|
| 2,941,741 | 6/1960 | Bilsback | 242/199 |
| 3,342,431 | 9/1967 | Mouissie | 242/197 |
| 3,665,114 | 5/1972 | Hathaway | 242/199 |

*Primary Examiner*—Leonard D. Christian

[57] ABSTRACT

A tape cartridge is formed with a normally closed split housing that encloses a partially open inner shroud within which a tape reel is mounted. When the cartridge is moved forward to a drive capstan at a read/-write station, the force of a tensioned closing element is overcome to open the housing. At such time, a spring-loaded element is released to urge the shroud forward, so that the tape reel is brought into contact with the capstan. The housing has external locking parts that afford coupling a plurality of cartridges, and thus allow serial movement of the locked cartridges past the read/write station.

10 Claims, 8 Drawing Figures

MAGNETIC TAPE CARTRIDGE AND STORAGE APPARATUS

BACKGROUND OF THE INVENTION

1. Field of the Invention

This invention relates to a magnetic tape cartridge useful in a tape library.

2. Description of the Prior Art

Magnetic tape has served extensively as a data recording medium, and has been used in high capacity storage and retrieval systems. The most widely used form of magnetic tape is the cylindrical reel. Generally, tape reels are manually selected from a library and then positioned in a drive, and subsequently are removed and replaced in the tape library. The trend has been to develop libraries that are more compact, yet have an increased amount of data; and which also are easier to handle. To this end, tape cartridges and cassettes are desirable. The type of tape cartridge that is used is a determinant of the capacity, access speed, and degree of error-free performance of the tape storage system and also of the wear life of the tape medium.

SUMMARY OF THE INVENTION

An object ot this invention is to provide a novel and improved tape cartridge.

Another object of this invention is to provide a compact cartridge that protectively encloses a tape reel during storage and that is easily opened and threaded for recording or playback.

Another object is to provide a simplified tape cartridge that requires no braking devices to retain the tape stationary in order to avoid unreeling when offline.

According to this invention, a tape cartridge is formed with an outer housing that is normally closed during storage. When located at a read/write position, the housing is pivotably opened for exposing a tape reel that is mounted within an inner shroud. When the outer housing is opened, the shroud and its mounted reel are automatically released and moved, by spring loaded means for example, towards the opening of the housing, whereby the tape reel is enabled to engage a rotating drive capstan. A multiplicity of these novel cartridges may be assembled in a tape library, wherein the cartridges are urged to move past the read/write station.

BREIF DESCRIPTION OF THE DRAWING

The invention will be described in greater detail with reference to the drawing in which.

Figure 1:
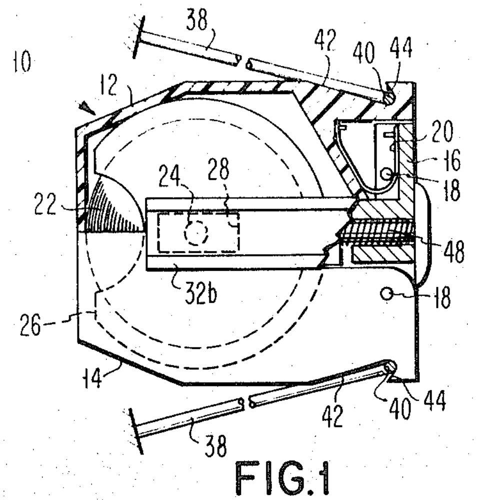
FIG. 1 is a side view of a tape cartridge, made in accordance with this invention, the upper half portion being shown in section.
Figure 2:
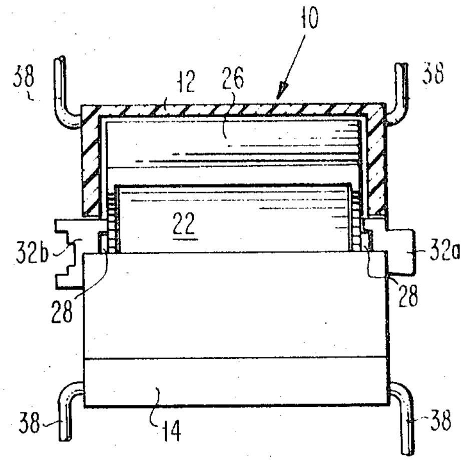
FIG. 2 is a front view of the tape cartridge illustrated in FIG. 1.
Figure 3:
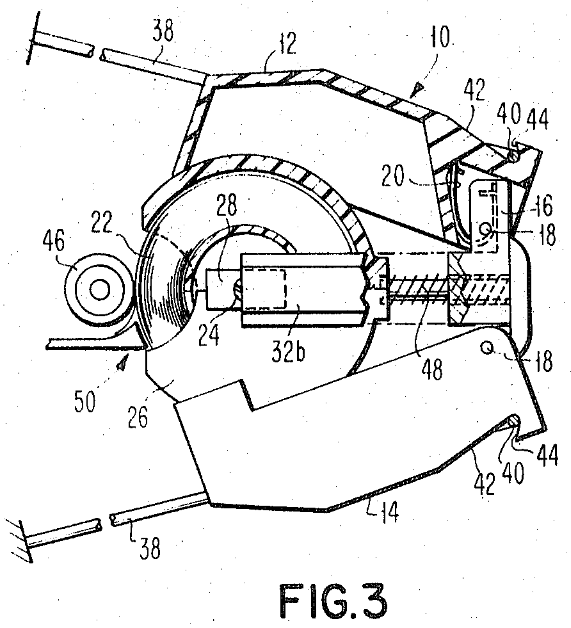
FIG. 3 is a side sectional view of the cartridge of FIG. 1, when opened, showing the tape in contact with a drive capstan.
Figure 4:
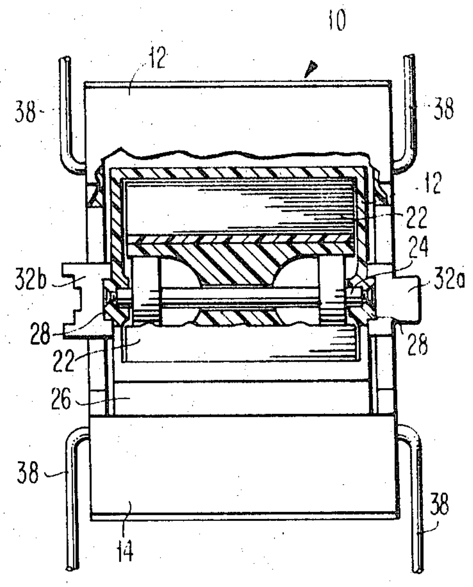
FIG. 4 is a front sectional view of the open cartridge of FIG. 3.

Similar numerals refer to similar elements throughout the drawing. Description of the Preferred Embodiment With reference to FIGS. 1 – 4, a tape cartridge 10 made in accordance with this invention includes a housing having upper and lower covers 12 and 14, and a yoke 16 to which the covers are attached. The covers 12 and 14 are pivotable about pins 18 fixed to the yoke, and the covers are each urged into a normally closed position by a spring-loaded element or closing spring 20 (only the one for the upper cover being shown). In the absence of any other forces, the load force of the closing spring will cause the covers 12 and 14 to be shut, thereby forming an enclosure with the yoke 16.

Within the cartridge housing or enclosure, a flangeless tape reel 22 is supported on a hub 24 that is mounted centrally and axially to a cylindrical shroud 26. The inner shroud 26 has a portion cut away to expose the tape reel to the front of the housing, when the covers 12 and 14 are open. Outer guide elements 28 protrude from the shroud and are made so as to ride within slots embodied in parallel rails 32 formed with the yoke 16 and extending along the sides of the shroud. The rails 32*a*, *b* are formed integrally with the rear-yoke section, the rail 32*a* having an outer male guide section, the other rail 32*b* having a female slotted guide section. By mating the guide sections 32*a* and 32*b*, with cooperating sections on adjacent like cartridges, a series of cartridges may be linked side by side. The arrangement of the male and female guide sections at the same location on each cartridge precludes the inversion or reversal of the cartridges when placed in the read/write station.

Figure 5:
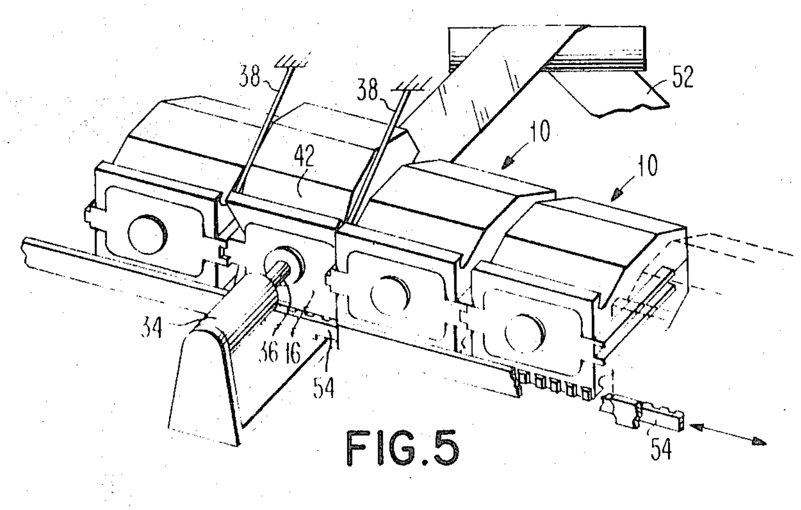
FIG. 5 is a perspective representation of an array of cartridges, illustrating means for loading the cartridges to a drive capstan.

In a tape library arrangement as depicted in FIG. 5, a number of like cartridges may be stepped along to and from a read/write station by means of step motor, for example. Each cartridge may bear a coded identification or address, such as by magnetic imprint, which is sensed and compared to a seek command address, thereby enabling selection of a desired cartridge for recording or playback.

When a selected cartridge 10 is positioned at the read/write position, a solenoid 34 which is part of the tape drive apparatus is actuated to force the solenoid core against the rear yoke 16, thereby moving the cartridge forward a predetermined distance, such as one-quarter inch for example. At the read/write station, a pair of rigid wire loops 38 that are attached to the drive housing are disposed adjacent to the covers 12 and 14. The wire loops 38 are shaped with a transverse bottom leg 40 that is angled or stepped away from the plane of the side legs. As the solenoid core 36 moves forward against the rear yoke of the cartridge, each wire leg 40 abuts a wall 44 at one end of covers 12 and 14. Further forward movement of the cartridge causes the wire leg 40 to press against the wall 44 with a force greater than that provided by the closing spring 20. This action results in forcing open the covers by pivoting action about fixed pins 18.

Within the housing, a spring-loaded element or pusher spring 48 exerts a constant force against the rear of the shroud 26 to push it forward along the rails 32. The exposed tape reel 22 is thus held against the inner walls of the covers 12 and 14. When the housing covers are snapped open the exposed tape reel 22 is forced by the spring 48 into intimate contact with a rotating drive capstan 46, and the reel, in turn, is rotated. As the tape reel 22 is rotated by the capstan 46, the tape leader, which may be thicker or heavier than the tape itself, is separated and lifted by a knife-edge peeler device 50. The tape leader and attached tape 52 are then guided along the capstan 46 and past guide posts and a read/write head to a takeup reel (not shown). After threading to the takeup reel, the tape is then unreeled from the shroud for recording or playback. The tape is scanned longitudinally by fixed heads, or transversely or helically by rotating heads, as is well known in the art. The pusher spring 48 serves to maintain pressure against the shroud, constantly forcing the shroud towards the capstan, thus ensuring frictional contact between the capstan and the unwinding tape reel 22. A slip clutch may be provided to supply a fixed drag on the tape in the unwind direction.

After the tape has been recorded or read out, the direction of capstan rotation is reversed to rewind the tape onto the hub 24 positioned in the shroud 26. After rewinding, the solenoid core 36 is retracted, and the contact force of the capstan 46 against the exposed full reel of tape is such that the inner shroud is pushed inwardly to the cartridge housing. When the shroud has been pushed a given distance into the housing, the closing spring 20 provides sufficient force to the covers 12 and 14 to close shut around the cylindrically shaped shroud and tape reel.

At this time, the conveyor 54 is activated to step the series of cartridges along the path of the conveyor, until another selected cartridge is reached. The conveyor is then stopped, the solenoid 34 is energized, and the selected cartridge is then advanced and opened for processing by the tape drive.

The cartridge of the invention may also be used in a manual selection system. In such event, a single cartridge 10 is manually placed at the read/write station, with the rails 32*a*,*b* engaging guide channels 56 and 58, illustrated in FIG. 6. The guide channels 56 and 58 are formed in the tape drive housing walls 60*a*,*b* that are used to support the single cartridge. The channel 56 is larger than channel 58 in order to accommodate the wider rail 32*b*.

Figure 6:
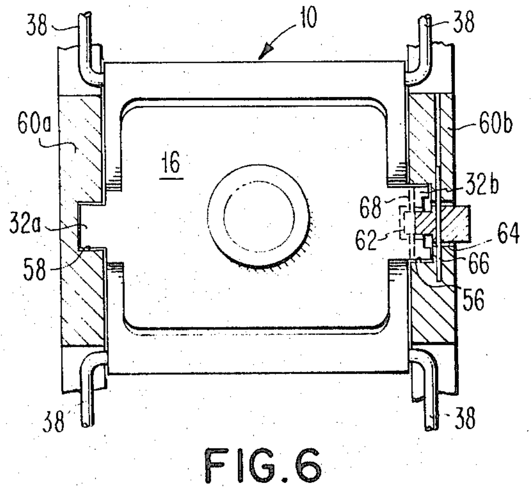
FIG. 6 is a rear view of part of a tape drive that accepts the cartridge of the invention manually.
Figure 7:
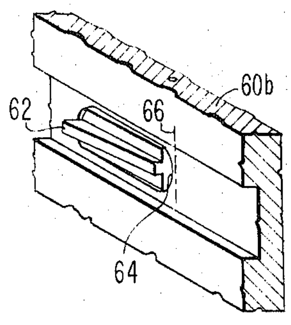
FIG. 7 is a side view of a latching device used in the manual load operation for retaining the cartridge in an open position.
Figure 8:
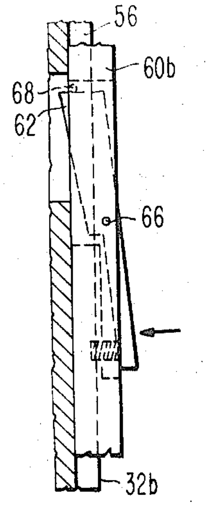
FIG. 8 is a top view of the latching device when engaged with the manually loaded cartridge.

Insertion of the cartridge at the read/write station is achieved by sliding the rails 32 into the guide channels 56 and 58 until the walls 44 of the covers 12 and 14 meet the legs 40 of the wire loops 38. The jaw-like covers 12 and 14 are opened by pushing the cartridge towards the drive capstan for approximately another quarter inch, as previously described. However, in this case of manual operation, to ensure that the covers will not be forced back by pressure against the tape reel 22 by the capstan 46, a latch mechanism 62 is provided in a slot 64 formed in the housing wall 60*a*, as illustrated in FIGS. 6 – 8. The latch 62 is mounted on a pivot pin 66 that is set vertically in the housing wall 60*a*, and is spring loaded so that it normally sits with its front end angled into the cavity between the opposing walls 60*a* and 60*b*.

As the cartridge 10 is manually inserted, the latch mechanism 62 is first depressed outwardly, and after further insertion of the cartridge along the channels 56 and 58, the latch is returned by the spring load force to engage the groove of the female guide rail 32*b*. Thus, as the covers 12 and 14 are forced open against the wires 38, the latch 62 is seated in the groove of the rail 32*b*, and the forward end of the latch is pressed against a stop pin 68 in the groove of rail 32*b*. By means of the latching mechanism 62, the open cartridge 10 is firmly fixed with the tape reel 22 against the capstan 46 and the wire loop 38 against the ramp walls 44, so that the cartridge is not able to slip back from the capstan pressure and release itself from the wire loops 38, which would tend to close the covers 12 and 14.

After the selected tape reel has been processed at the read/write station, the outer rear portion of the latch mechanism 62 is manually depressed, thereby pivoting the latch around the pivot pin 66, so that the front end of the latch is retracted into the slot 64. In this manner, the latch is no longer effective to maintain the covers 12 and 14 in an open position, and the covers automatically snap shut in response to the forces of the closing springs 20. With the cartridge closed and relieved of the pressure between the drive capstan 46 and tape reel 22, and the wire loops 38, the cartridge may then be manually removed along the guide channels 56 and 58, with wire legs 40 sliding along ramp walls 44.

There has been disclosed herein a simplified, inexpensive tape cartridge that affords several advantages and features, and which lends itself easily to manual or automatic handling. For example, no braking mechanism is required to hold the tape reel stationary when the cartridge is closed, because the tape reel is positioned against the inner walls of the closed cartridge covers. Automatic sequential loading or manual loading are possible with this novel cartridge. Only a short stroke and little force is needed to open the cartridge at a read/write station and the short stroke movement is sufficient to engage the tape with a drive capstan. In addition, automatic threading is easily accomplished. With the cartridge of this invention, as the tape is unwound, the tape reel is constantly urged against the rotating capstan, thereby maintaining proper frictional engagement between the tape and the capstan. No special ejection device is needed, since the snapping of the covers and the pressure of the wire loops against the ramp walls of the covers tend to retract the cartridge for removal from the read/write station. Furthermore, the cartridge is foolproof in that backward or upside down insertion is not possible. Additionally, the closed cartridge seals the tape against contaminants in the surrounding environment.

It should be understood that modifications and variations of the tape drive assembly and cartridge may be employed within the scope of the invention.

What is claimed is:

1. A tape cartridge assembly comprising:

a split housing having covers forming an enclosure;

means disposed within said housing for urging said covers to be normally closed;

a partially opened shroud for supporting a wound tape positioned within said housing;

means formed on said housing covers for enabling opening of said housing in cooperation with an external forcing means;

means contained within said housing for pushing said shroud and said tape towards the opening of said housing, so that said tape may be engaged with a drive capstan.

2. A tape cartridge assembly as in claim 1 including a yoke structure; and means for mounting said covers to such yoke structure, so that said covers pivot open in response to said opening enabling means and said external forcing means.

3. A tape cartridge assembly as in claim 1, wherein said urging means comprises a preloaded spring element to maintain said covers closed.

4. A tape cartridge assembly as in claim 3, wherein said enabling means for opening said housing includes an abutting wall; and said external forcing means comprises stationary wire means, so that when said wall is moved against said wire means, the force of said preloaded spring element is overcome and said housing covers are pivoted to swing open.

5. A tape cartridge assembly as in claim 1, including guide elements formed in said shroud; and further including rails adjacent to said guide elements, so that said shroud is guided towards said opening in response to said pushing means when said covers are open.

6. A tape cartridge assembly as in claim 5, wherein said rails comprise a male protruding section at one side of said cartridge, and a female slotted section at the other side of said cartridge, so that a plurality of like cartridges may be linked side by side.

7. A tape drive apparatus for automatically processing a plurality of normally closed, linked tape cartridges comprising:

a drive capstan positioned adjacent to a processing station;

a solenoid positioned at said station in opposition to said capstan for advancing a tape cartridge towards said capstan when said solenoid is energized;

stationary wire loop means fixed to said drive apparatus at said station for forcing open said normally closed tape cartridge to expose a tape reel to said capstan, while said cartridge is advanced;

said tape cartridge including means to urge said tape reel into frictional contact with said capstan, so that the tape may be unreeled and rewound by the rotation of said capstan.

8. A tape drive apparatus as in claim 7, including a conveyor for transporting said plurality of cartridges to and from said processing station.

9. A tape drive apparatus as in claim 7, including a peeler device for separating the tape leader from said tape reel to enable the drive capstan to engage said tape for unwinding and winding.

10. A tape drive apparatus for manually processing a single normally closed tape cartridge comprising:

a drive capstan positioned adjacent to a processing station;

a wall structure having guide channels for supporting and guiding said tape cartridge to and from said capstan;

wire means fixed to said drive apparatus at said station for forcing open said normally closed tape cartridge to expose a tape reel to said capstan, while said cartridge is advanced;

said tape cartridge including means to urge said tape reel into frictional contact with said capstan, so that the tape may be unreeled and rewound;

a latch located in one of said wall guide channels for engaging and maintaining said cartridge open while the tape is being driven by said capstan, said latch being spring loaded and pivotable to allow disengagement of said latch from said cartridge, so that said cartridge may be closed and withdrawn from said processing station.

* * * * *